June 3, 1941.  A. G. DAVIS  2,244,640
GASKET
Filed Dec. 31, 1940
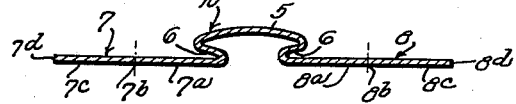
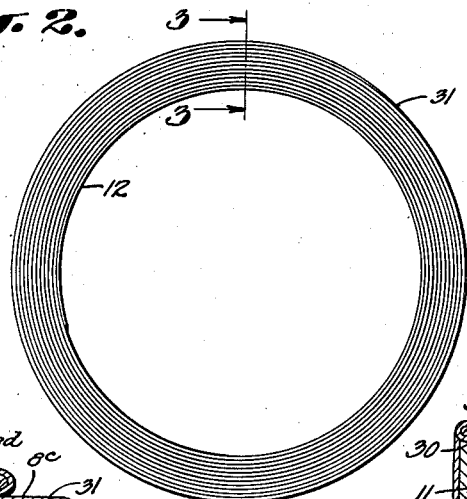
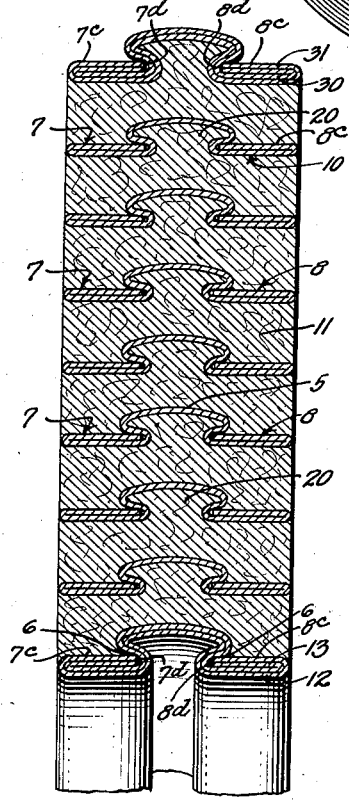 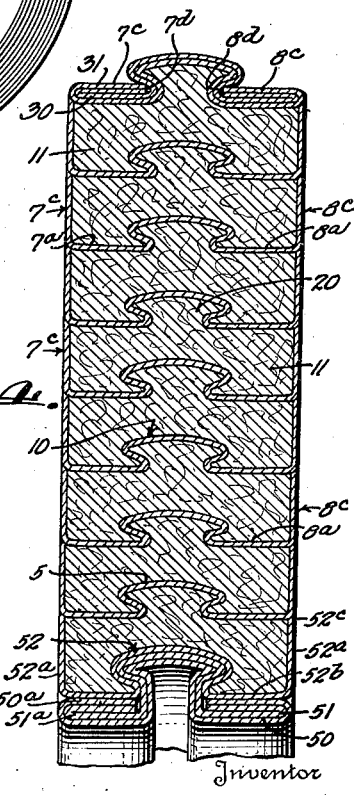
Inventor
ARTHUR G. DAVIS
By Joseph Roseman
Attorney Patented June 3, 1941

2,244,640

UNITED STATES PATENT OFFICE 2,244,640

GASKET

Arthur G. Davis, South Merchantville, N. J., assignor to United States Gasket Company, Camden, N. J., a corporation of New Jersey Application December 31, 1940, Serial No. 372,645

8 Claims. (Cl. 288—27)

This invention relates to gaskets. More particularly, the invention relates to a gasket construction made of a coiled metal strip having a specially formed cross-sectional contour and having non-metallic packing interposed between the convolutions of the metal strip.

Gaskets have been made heretofore from spirally wound metallic strips between the turns of which has been placed sheet or cord asbestos or other non-metallic packing. The outer ends as well as the inner ends of such spirally wound metal strips have either been crimped, soldered or welded where the first turn begins to cover the second turn in order to prevent opening of the gasket. More recently a gasket has been developed with the first two windings of the metal strip as well as the last two having the outer edges bent over upon themselves, but because of the shape of the metal strip used the outer edges of the last and next to the last turn on the said gasket have been left open and exposed on the outside of the said gasket. The disadvantage of such gasket is apparent upon the removal of same from a fitting where pressure had been applied on its sealing surfaces. Such gasket has a tendency to loosen at the folded edges on the outer edge of the gasket when pressure is applied. The folded over edges tend to be forced away from the body of the gasket and become loose and do not provide the solid non-distortable packing as provided by the present invention.

As for gaskets having crimped edges, soldered or welded ends for retaining the metal strip, such gaskets are only as strong as the crimp, solder or weld, and easily break and unravel at such fastening point.

With these particular disadvantages of prior gaskets in mind, I have developed a gasket made with a specially formed coiled metal strip having interposed between the coils a flat asbestos strip or other packing, the thickness of which varies with the amount of pressure that will be used on the packing, and which variation in the thickness does not change the manner of assembly of my gasket other than varying the number of turns of the metal strip and asbestos to any given gasket face or surface. This asbestos or other non-metallic strip packing is held securely in place by the turns of metal strip which is provided with a bead and locking pocket portions hereinafter more fully disclosed. My gasket is not crimped, welded or soldered at the point where the free ends of the windings are found, but is secured at the ends by folding over the flange portions of the first two metal windings, with the free edges of the flange portions inserted and locked in the pocket portions formed on both sides at the base of the bead. Thus the free edges of the last two windings are securely held or locked in the pocket portion formed by the bead and the body of the gasket. The inner intermediate windings of the metal strip have their free edges folded over and locked in the pocket portion previously described, thereby providing reenforced margins of double ply thickness which serve to distribute and take up the pressure applied to the gasket when in use. The gasket made in accordance with the present invention can withstand extremely high pressures without breaking down or opening up at any point.

The invention will be more fully understood from the following specification and accompanying drawing, wherein Figure 1 is a cross-sectional view of the metal strip used in making the gasket, Figure 2 is a plan view of one of the flat faces of the completed gasket, Figure 3 is a sectional view taken on a line 3—3 of Figure 1, and Figure 4 is a sectional view illustrating a modified form of the gasket construction utilizing the same spirally wound metallic strip as illustrated in Figure 1.

Referring more particularly to the drawing, Figure 2 illustrates an edge view of the completed gasket formed of a spirally wound or coiled metal strip 10 and asbestos strip or other suitable non-metallic packing 11 interposed between the metal coils, except that no packing is interposed between the first two innermost windings 12 and 13 and last two outermost windings 30 and 31, for a purpose to be explained. The metal strip 10 utilized for making the gasket is preferably made of steel and has the initial contour shown in Figure 1. The strip is provided with a medially positioned continuous longitudinally extending bead portion 5, which is somewhat mushroom-shaped in cross-section, and reentrant longitudinally extending continuous pocket portions 6 at the base of the bead portion on each side thereof, and flat marginal flange portions 7 and 8 extending laterally on each side of the bead portion.

In forming the gasket, a metal strip 10 of suitable length is secured and wound on a mandrel of suitable diameter so that two full convolutions 12 and 13 are wound up in face to face contact with each other. The lateral marginal flange portions 7 and 8 of these two convolutions are then folded at about points 7b and 8b, respectively, which are preferably located at about the midpoint of the marginal portions, and turned inwardly toward the bead 5. The free edge portions 7b and 8b of the marginal flange portions are then inserted into the pocket portions 6 and firmly locked therein. The superposed portions of the margins are preferably firmly pressed together into face contact as illustrated in Figure 3 to form a four-ply reenforced marginal flange portion. This operation serves to firmly lock the two inner convolutions of the metal strip which will not open up when the gasket is in use under high pressure.

One end of a strip of asbestos or other nonmetallic packing 11 of suitable length and dimensions is then wound about the inner convolution 13 and then the next convolution of the metal strip is wound over the asbestos strip, the marginal flanges 7 and 8 of this convolution also being folded over and locked in the pocket portions 6 as the metal strip is fed to the forming mandrel. Suitable pressure is applied to the combined convolutions so as to consolidate the metal strip and asbestos into locking engagement. A portion of the asbestos packing strip will be forced into the inner portion 20 of the bead and also into the pocket portion region 6 whereby a very firm and rigid structure is produced. A suitable number of metal and asbestos convolutions are thus superposed depending upon the required size of the final gasket.

In order to firmly lock the outer convolution of the metal strip the two outer convolutions 30 and 31 are wound in face to face contact without any asbestos therebetween and the marginal flange portions 7 and 8 are folded over and the free edge portions 7b and 8b are inserted and locked in the pocket portions 6 as previously explained in connection with the inner convolutions 12 and 13.

A gasket so produced will have the final appearance as illustrated in Figure 2 which embodies many new advantages and overcomes the defects of prior gaskets as previously noted. The use of a metal strip of the special contour results in a number of important features in the final gasket. The medially positioned bead provides a positive retaining means for the asbestos strip. The pocket portions serve to retain and firmly lock the free edges of the folded over lateral marginal flange portions. The outer convolution is also locked and retained by means of the reentrant pocket portions and there are no exposed free edges so that the outer edge of the gasket is closed, continuous and sealed throughout. Both the outer and inner convolutions are firmly retained and reenforced at their margins by the four-ply marginal flange portion. The marginal portions of the intermediate convolutions of the metal strip are reenforced by being formed of folded over double ply portions of the strip. This reenforcement serves to greatly strengthen the gasket so that it can withstand distortion and stresses at great pressures.

The bead construction also provides a resisting strut action against compression and serves to distribute any compressive forces which may be applied to the gasket, thereby preventing undue flattening of the asbestos and consequent distortion of the gasket. The gasket of the present construction thus has numerous advantages resulting in better service and longer life. The structure is simple and inexpensive to manufacture as it can be produced by continuous operation from a single metal strip.

A further modification of the gasket construction is illustrated in Figure 4, wherein the gasket is constructed of a metal strip also having the contour as shown in Figure 1. In this construction the three innermost convolutions 50, 51 and 52 are wound in contact with each other without any packing therebetween. The marginal flange portions 50a and 51a of the two innermost convolutions are then folded inwardly toward the bead portion 5. The marginal flange portion 52a is then folded at right angles to portion 52b so that the free edge portion 52c contacts the next succeeding convolution. A suitable number of further convolutions 10 are then formed, the marginal flange portions 7c and 8c thereof also being folded at right angles to portions 7a and 8a respectively so as to contact the next succeeding convolution as shown in Figure 4. The two outermost convolutions 30 and 31 are then formed without any packing therebetween and their lateral flange portions 60a and 61a folded over and locked in the pocket portions 6 in a manner similar to that explained in the gasket illustrated in Figure 2. In this construction the lateral faces of the gasket will be entirely closed by means of the folded flange portions of the metal strip and the asbestos or other packing will be protected against contact with oil, water or other deleterious substances.

Changes and modifications may be made in the specific embodiments of the gasket construction herein disclosed without departing from the spirit of the invention and it is intended to include such modifications within the scope of the appended claims.

I claim:

1. A gasket comprising a metal strip spirally wound and a non-metallic packing strip interposed between the convolutions, said metal strip having a bead portion extending longitudinally at the medial region thereof, reentrant continuously extending pocket portions at the base of each side of said bead portion, the two outermost and innermost metal convolutions of said metal strip being in face contact without any packing interposed therebetween, said outer and inner convolutions being fixedly locked together and the marginal flanges thereof folded inwardly toward said bead portions and the free edges of said flanges being inserted and locked in said pocket portions.

2. A gasket comprising a steel strip spirally wound and an asbestos strip interposed between the convolutions, said metal strip having a bead portion extending longitudinally at the medial region thereof, reentrant continuously extending pocket portions at the base of each side of said bead portion, the two outermost and innermost metal convolutions of said metal strip being in face contact without any asbestos interposed therebetween, said outer and inner convolutions being fixedly locked together and the marginal flanges thereof folded inwardly toward said bead portions and the free edges of said flanges being inserted and locked in said pocket portions.

3. A gasket comprising a metal strip spirally wound and a non-metallic packing strip interposed between the convolutions, said metal strip having substantially mushroom-shaped bead portion extending longitudinally at the medial region thereof, reentrant continuously extending pocket portions at the base of each side of said bead portion, the two outermost and innermost metal convolutions of said metal strip being in face contact without any packing interposed therebetween, said outer and inner convolutions being fixedly inwardly locked together and the marginal flanges thereof folded toward said bead portions and the free edges of said flanges being inserted and locked in said pocket portions.

4. A gasket comprising a metal strip spirally wound and a non-metallic packing strip interposed between the convolutions, said metal strip having a bead portion extending longitudinally at the medial region thereof, reentrant continuously extending pocket portions at the base of each side of said bead portion, the two outermost and innermost metal convolutions of said metal strip being in face contact without any non-metallic packing interposed therebetween, said outer and inner convolutions being fixedly locked together and the marginal flanges thereof folded toward said bead portions, and the free edges of said flanges being inserted and locked in said pocket portions, said metal strip and packing strip being consolidated under pressure and portions of said packing strip being interlocked within the inner portion of said bead and said pocket portions.

5. A gasket comprising a metal strip spirally wound and a non-metallic packing strip interposed between the convolutions, said metal strip having a bead portion extending longitudinally at the medial region thereof, reentrant continuously extending pocket portions at the base of each side of said bead portion, the two outer and inner metal convolutions of said metal strip being in face contact with no non-metallic packing interposed therebetween, said outer and inner convolutions being fixedly locked together and the marginal flanges thereof folded toward said bead portions to provide four-ply flanges and the free edge of said flanges being inserted and locked in said pocket portions, and the flanges of the metal strip intermediate said two outermost and innermost convolutions being folded toward said bead portions to provide two-ply flanges and the free edges of said flanges being inserted and locked in said pocket portions.

6. A gasket comprising a metal strip spirally wound and a non-metallic packing strip interposed between the convolutions, said metal strip having a bead portion extending longitudinally at the medial region thereof, reentrant continuously extending pocket portions at the base of each side of said bead portion, the two outermost and innermost inner metal convolutions of said metal strip being in face contact without any packing interposed therebetween said outer and inner convolutions being fixedly locked together and the marginal flanges thereof folded toward said bead portions to provide four-ply flanges and the free edges of said flanges being inserted and locked in said pocket portions, said metal strip and packing strip being consolidated under pressure and portions of said packing strip being interlocked within the inner portion of said bead and said pocket portions, and the flanges of the metal strip intermediate said two outermost and innermost convolutions being folded toward said bead portions to provide two-ply flanges and the free edges of said flanges being inserted and locked in said pocket portions.

7. A gasket formed of a strip of metal spirally wound with non-metallic packing interposed between convolutions thereof, said metal strip having a substantially mushroom-shaped bead portion extending longitudinally at the medial region thereof, reentrant, continuously extending pocket portions at the base on each side of said bead portion, and lateral flange portions extending from said pocket portions and of a suitable width adapted to be folded inwardly toward said bead portion so that the free edges thereof are insertable in said pocket portions and locked therein.

8. A gasket formed of a strip of steel spirally wound with non-metallic packing interposed between convolutions thereof, said metal strip having a bead portion extending longitudinally at the medial region thereof, reentrant, continuously extending pocket portions at the base on each side of said bead portion, and lateral flange portions extending from said pocket portions and of a suitable width adapted to be folded inwardly toward said bead portion so that the free edges thereof are insertable in said pocket portions and locked therein.

ARTHUR G. DAVIS.